US005142278A

United States Patent [19]

Moallemi et al.

[11] Patent Number: 5,142,278

[45] Date of Patent: Aug. 25, 1992

[54] CURRENT CARRIER TRACTOR-TRAILER DATA LINK

[75] Inventors: Kamran Moallemi, San Diego; Franklin P. Antonio, Del Mar; Daniel K. Butterfield, Solana Beach; Lindsay A. Weaver, Jr., San Diego, all of Calif.

[73] Assignee: Qualcomm Incorporated, San Diego, Calif.

[21] Appl. No.: 620,133

[22] Filed: Nov. 30, 1990

Related U.S. Application Data

[63] Continuation of Ser. No. 339,686, Apr. 18, 1989, abandoned.

[51] Int. Cl.[5] ........................ H04M 11/00; B60L 1/00

[52] U.S. Cl. .......................... 340/825.06; 340/310 A; 340/310 R; 340/538; 307/10.1

[58] Field of Search ...................... 340/825.06, 825.49, 340/538, 539, 901, 902, 904, 310 A, 310 R; 455/343; 364/424.01, 424.03, 424.05; 307/9.1, 10.1; 246/2 R, 3, 7, 122 R

[56] References Cited

U.S. PATENT DOCUMENTS

| | | | |
|---|---|---|---|
| 3,568,161 | 3/1971 | Knickel | 340/172.5 |
| 3,947,807 | 3/1976 | Tyler et al. | 340/23 |
| 4,067,061 | 1/1978 | Juhasz | 364/900 |
| 4,139,737 | 2/1979 | Shimada et al. | 340/310 A |
| 4,224,596 | 9/1980 | Knickel | 340/24 |
| 4,258,421 | 3/1981 | Juhasz et al. | 364/424 |
| 4,459,595 | 7/1984 | Kramer et al. | 343/701 |
| 4,531,237 | 7/1985 | Bar-On et al. | 455/343 |
| 4,673,921 | 6/1987 | Saito et al. | 340/539 |
| 4,698,748 | 10/1987 | Juzswik et al. | 455/343 |
| 4,701,760 | 10/1987 | Raoux | 340/993 |
| 4,706,086 | 11/1987 | Panizza | 340/902 |
| 4,839,530 | 6/1989 | Greenwood | 307/9.1 |
| 4,897,642 | 1/1990 | DiLullo et al. | 340/825.06 |
| 4,926,158 | 5/1990 | Zeigler | 340/538 |
| 4,952,905 | 8/1990 | Oliver | 340/310 A |

*Primary Examiner*—Donald J. Yusko
*Assistant Examiner*—Peter S. Weissman
*Attorney, Agent, or Firm*—Russell B. Miller

[57] ABSTRACT

An apparatus and method for providing communication of information between a truck tractor and trailer via existing truck wiring. At least one transmitter is located in each trailer for generating a unique identification signal representative of trailer identification information corresponding to the trailer in which the transmitter is located, modulating the identification signal, and providing the modulated identification on an existing truck power bus coupling the tractor and trailer. A receiver is located in the tractor for receiving each modulated identification signal on the power bus, demodulating each modulated identification signal and providing each demodulated identification signal to a mobile communications terminal located in the tractor for transmission to a central facility. The system may further include the transmission of trailer status or load status information by the transmitter to the receiver in a similar manner as the identification information.

17 Claims, 5 Drawing Sheets

CURRENT CARRIER TRACTOR-TRAILER DATA LINK

This is a continuation of application Ser. No. 07/339,686 filed Apr. 18, 1989, now abandoned.

BACKGROUND OF THE INVENTION

I. Technical Field

The present invention relates to mobile communication systems. More specifically, the present invention relates to a novel improvement in truck mobile communication systems which facilitates the transmission of trailer identification and trailer status information to a truck tractor which is capable of relating the information to a customer facility.

II. General Background

Mobile communication systems are utilized by commercial trucking companies to locate, identify and ascertain status of their vehicles. Mobile communications systems are also used to send information, and receive information and information requests from the operator of their vehicles.

A pressing problem facing todays trucking industry is the difficulty in keeping track of the location of its various trailers throughout the country. Quite often a trailer is left at a location, either by design or accident, and later forgotten about. The unnecessary down time on these commercial trailers can result in a substantial economic impact on the commercial trucking company.

It is standard practice for commercial trucking companies to offer bounties for the location of misplaced trailers unaccompanied by a tractor. This bounty motivates truck drivers and other drayage personnel to report the location of otherwise unreported mislocated trailers. The offering of a bounty also may motivate truck drivers to intentionally leave a trailer at an incorrect location so as to be able to claim that bounty when they report the location. This problem can result in an inordinate number of commercial trailers being left at inappropriate locations for an inappropriate amount of time.

Along with ascertaining the location of various trailers, it is also desirable to ascertain the status of equipment, environmental conditions, or payloads within these trailers. For example, it is useful to be able to monitor various parameters affecting the cargo of the trailers such as temperature and pressure inside the trailer. It is also useful to be alerted to potential hazards which may be indicated by parameters such as radiation levels and gas leakage.

A mobile communication system which implements a unit installed in the cargo carrying trailer can facilitate the communication of tractor-trailer connection and disconnection activity, as well as cargo status information, to a trucking company home base, via a mobile communications terminal within the tractor. It is desirable to have such a trailer unit utilize existing tractor-trailer electrical wiring and available power so as to minimize the modifications to the tractor and trailer needed to facilitate the implementation of this communication system.

It is therefore, an object of the present invention to provide a novel and improved mobile communication system which will facilitate locating and identifying misplaced commercial trailers.

It is another object of the present invention to provide a novel and improved method and apparatus for communicating trailer identification and status information to the driver of the tractor hauling the trailer, and to the trucking company home base via the mobile communications terminal in the tractor.

It is a further object of the present invention to provide a novel and improved method and apparatus for using existing tractor-trailer electrical wiring and available truck power to power the mobile communication system of the present with minimal power drain on the truck.

SUMMARY OF THE INVENTION

The present invention relates to a novel and improved trailer identification system which incorporates a tractor-trailer datalink which is capable of providing trailer identification information and status data to the tractor. A truck in accordance to the present invention is comprised of a tractor having a mobile communications terminal and at least one trailer. The tractor provides electrical power to each trailer by a common power bus. The trailer identification system provides trailer identification information to the tractor via the power bus to the truck for transmission by the mobile communications terminal. The trailer identification system comprises at least one transmitter located in a corresponding trailer for generating a unique identification signal representative of trailer identification information corresponding to the trailer in which the transmitter is located. The transmitter generates a carrier signal that is modulated by the identification signal. The transmitter then provides the identification signal modulated carrier signal on the power bus. A receiver located in the tractor receives each identification signal modulated carrier signal transmitted upon the power bus from a respective trailer and demodulates each signal to provide the identification signal. The identification signal is then provided as trailer identification information to the mobile communications terminal for transmission to a central facility.

The identification system may further comprise means by which the transmitter interrogates a physical parameter monitoring system in the trailer and in response thereto receives from the physical parameter monitoring system signals indicative of measured physical parameters. The transmitter modulates the parameter data and transmits the modulated data via the power bus to the receiver. The receiver receives and demodulates the modulated data signal and provides the demodulated data signal to the mobile communications terminal.

BRIEF DESCRIPTION OF THE DRAWINGS

These and other features, and advantages of the invention will become fully apparent from the detailed description set forth below when taken in conjunction with the drawings in which like reference characters correspond throughout and wherein.

DETAILED DESCRIPTION OF PREFERRED EMBODIMENTS

Figure 1:
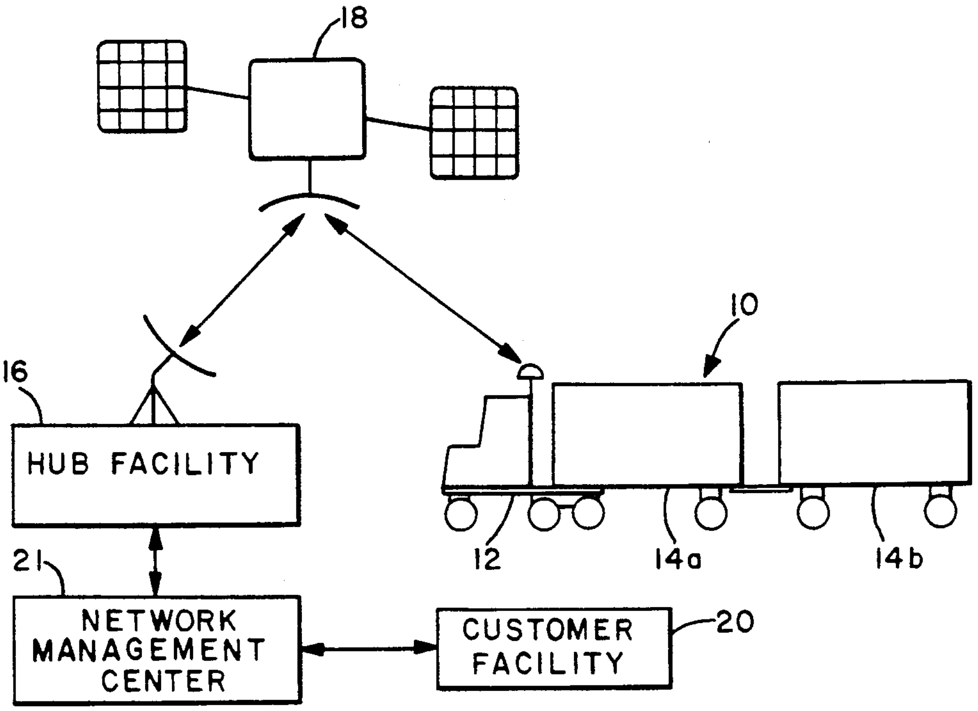
FIG. 1 is an illustration of one environment of a mobile communication system in which the present invention may operate.

One communication system environment in which the present invention may operate is depicted in FIG. 1. In FIG. 1 the communication system is illustrated as having a mobile terminal (not shown) mounted in a vehicle such as truck 10. Truck 10 is illustrated in FIG. 1 as comprising tractor 12 and trailers 14*a* and 14*b*. Although truck 10 is 15 illustrated as having two trailers, trailers 14*a* and 14*b*, it is understood that more or fewer trailers may be utilized. Truck 10 represents any of a variety of vehicles whose occupants desire to obtain occasional or updated information, status reports, or messages from a central communication source. A system such as this would allow truck drivers and personnel ready access to messages for more efficient operation.

It is also very desirable to have a mobile system user, such as truck 10, to be able to communicate at least some form of limited message or acknowledgment to a central control station. Such messages may be unsolicited messages provided from the truck or messages generated in response to received messages. A reply message may prevent the need for further communications, or indicate a need for additional information or updated messages from new information provided by the vehicle driver. At the same time, by providing for a return link of communication, even if limited in content, it is possible to incorporate other features into the communication link. Such a return link communications may be in the form of a simple message of acknowledgment to provide verification of a message received by the terminal, whether or not the driver operates on the information. Other automatic responses may also be configured into the operation of the transceiver such as vehicle location, vehicle status, trailer identification or trailer status. The return link can also allow a driver to enter messages such as verification of time and delivery information, or a report on current position or other status information.

In the operation of the communications system, a message is transmitted between truck 10 and central transmission facilities or terminal 16, also referred to as a hub, typically via satellite 18.

Hub 16 is typically located in a remote location ideally suited for low interference ground to satellite transmission or reception. One or more system user facilities, i.e. customer facility 20, in the form of central dispatch offices, message centers, or communication offices, are tied through telephonic, optical, satellite, or other dedicated communication link to hub 16 via network management center 21. Network management center 21 can be employed to more efficiently control the priority, access, accounting, and transfer characteristics of message data. Network management center 21 is typically located at the same location as hub 16.

Network management center 21 is interfaced to existing communication systems using well known interface equipment such as high speed modems or codecs to feed message signals into the communication system. Network management center 24 utilizes high speed data management computers to determine message priorities, authorization, length, type, accounting details, and otherwise control access to the communication system.

Operating in a communication system environment such as that depicted in FIG. 1, the present invention would allow the communication from the mobile terminal in truck 10 to customer facility 18 to include trailer identification and load status information. In such a system each trailer is assigned a unique trailer identification number or code. A transmitter (not shown) is typically located in each trailer for generating a corresponding identification code. The identification code is then transmitted to a receiver (not shown) located in tractor 12 via the existing power and indicator control cabling or wiring between trailers 14*a* and 14*b*, to tractor 12. The receiver provides the identification code to the tractor mobile communication terminal (not shown) for transmission to hub 16. Position of a trailer, once detached from the tractor, may be derived from the location of truck 10 at which the last transmission of the trailer identification information by the mobile communications terminal to hub 16 occurred.

Throughout the description herein, the invention is described with the transmitter being located in the trailer. However, it should be further understood that the transmitter may be used in association with any vehicle-type existing power and indicator control cabling. An example of one such vehicle is the well known dolly.

Figure 2:
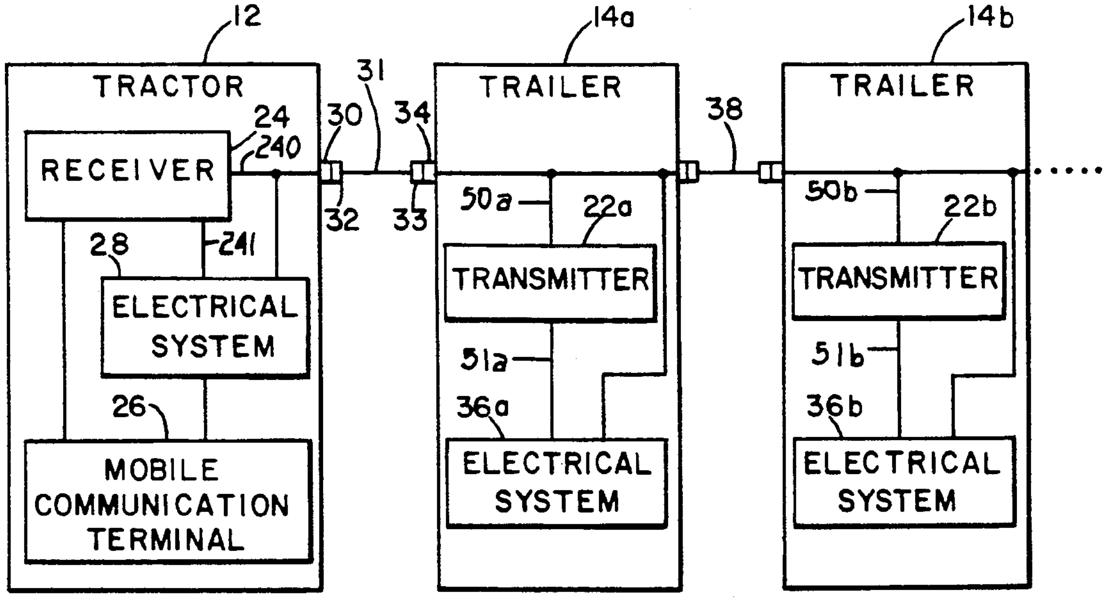
FIG. 2 is an illustration of an exemplary configuration of the present invention in which the major components are identified as installed in a trucking system.

Referring to FIG. 2, the elements of the data link of the present invention consists of one or more transmitters, transmitters 22*a* and 22*b*, each of which are respectively located in a trailer, trailers 14*a* and 14*b*. Although truck 10 is illustrated in FIG. 2 as having two trailers each with a transmitter, it is envisioned that only one trailer with a transmitter may be utilized. Furthermore, it should be understood that one or more trailers may be utilized with all or fewer than all having transmitters. Tractor 12, which hauls trailers 14*a* and 14*b*, has located therein receiver 24 which interfaces transmitters 22*a* and 22*b* to mobile communication terminal 26 also located in tractor 12.

It is a feature of the present invention to utilize the existing electrical wiring of the tractor and trailers for communication from transmitters 22*a* and 22*b* to receiver 24. Receiver 26 and transmitters 22*a* and 22*b* are also coupled to the existing wiring so as to allow access to the truck battery power, in addition to allowing communication between receiver 24 and transmitters 22*a* and 22*b*.

Tractor 12 includes an electrical system 28 which incorporates a battery, a battery recharging system and electrical controls including indicators and various other well known electrical apparatus. Electrical system 28 provides battery power to mobile communications terminal 26 and to receiver 24. Electrical system 28 also provides an output of battery power and trailer indicator control typically at a seven-pin connector 30. A seven conductor pig-tail cable 31 is used to couple battery power and trailer indicator control signals from tractor 12 to trailer 14*a*. Cable 31 includes a mating connector 32 at one end thereof for coupling cable 31 to connector 30. A second mating connector 33 is coupled at the other end of cable 31. Connector 33 mates with connector 34 at trailer 14*a*. Trailer 14*a* includes an electrical system 36*a* along with transmitter 22*a* that is connected to connector 34. Electrical system 36*a* typically includes trailer indicator lights such as stop lights, running lights, turn signals, brake lights, and etc.

When an additional trailer, such as trailer 14*b*, is connected to trailer 14*a*, it is also electrically coupled to tractor 12 via the wiring of trailer 14*a* and pig-tail cable 38. Trailer 14*b* also includes an electrical system 36*b* along with transmitter 22*b* that are coupled to cable 38. Electrical system 36*b* may be the same in terms of function as electrical system 36*a* or slightly different according to the type of trailer utilized.

Transmitters 22*a* and 22*b* may perform two basic functions. First, all transmitters generate an identification code or number unique to the trailer to which they are installed, which they can communicate to the receiver. Second, specially configured transmitters may provide the capability for acquiring information from various data monitoring systems which may be installed in the trailer, and communicate this information to the receiver.

Figure 3:
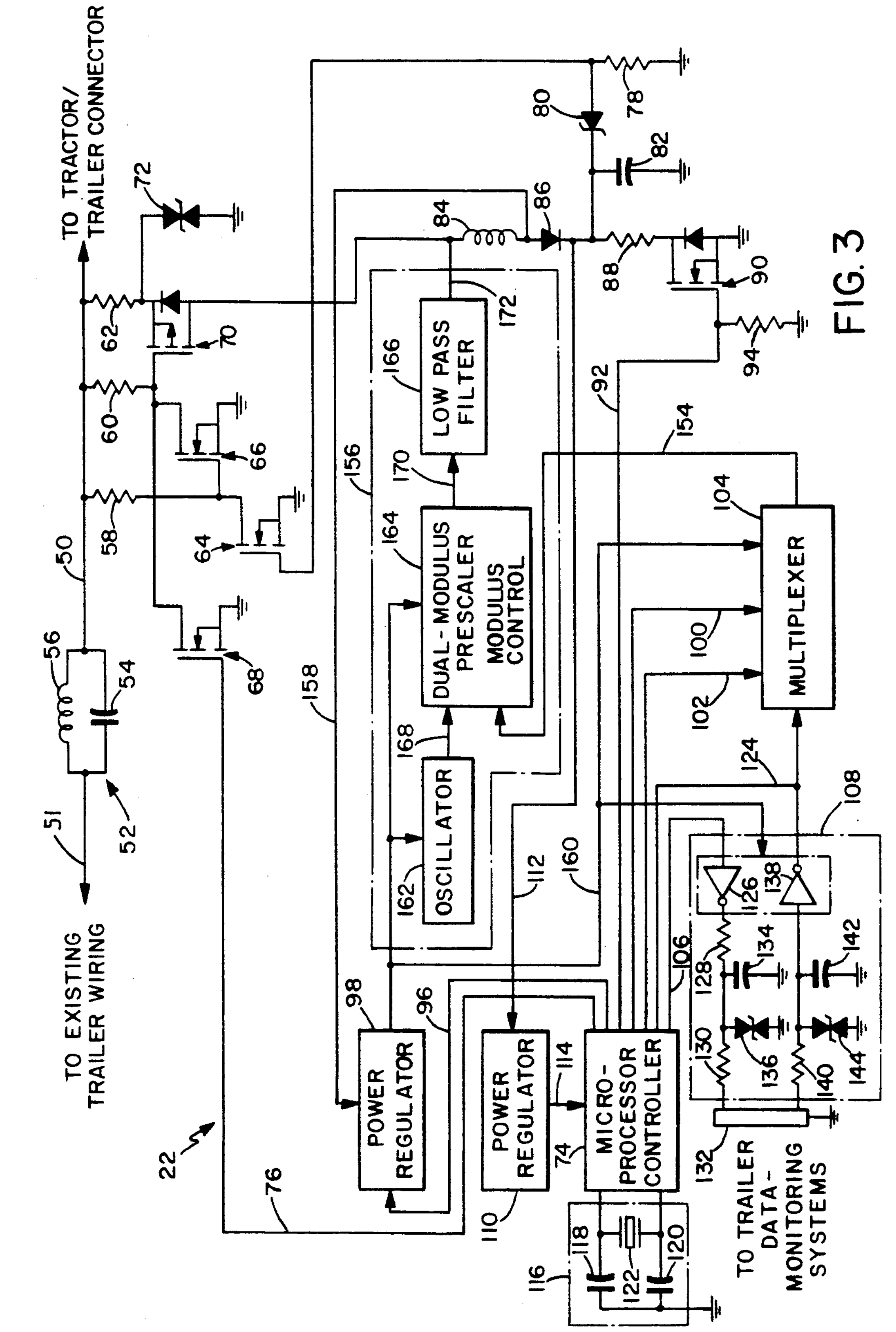
FIG. 3 is a schematic diagram of the transmitter of the present invention.

FIG. 3 is a schematic diagram of an exemplary transmitter 22 of the present invention. Transmitter 22 as illustrated in FIG. 3 is an embodiment of each of transmitters 22*a* and 22*b* of FIG. 2. Portions of the +12 volt d.c. auxiliary conductor of the existing trailer wiring are indicated by the reference numerals 50 and 51. Conductor or line portion 50 connects the tractor/trailer connector to transmitter 22 and tuned circuit 52. Conductor or line portion 51 connects the trailer electrical system, and any other trailer electronics, to tuned circuit 52. The trailer electrical system and electronics other than that of the transmitter, such as indicator lamps, that are also coupled to the auxiliary conductor are isolated from high frequency signals generated by transmitter 22 by tuned circuit 52 and vice versa. Tuned circuit 52 is comprised of parallel coupled capacitor 54 and inductor 56.

Transmitter 22 is further coupled to line portion 50 at one end respectively of resistors 58, 60 and 62. The other end of resistor 58 is coupled to the drain of n-channel FET 64 and the gate of n-channel FET 66 while the sources of FETs 64 and 66 are coupled to ground. The other end of resistor 60 is coupled to the drain of FET 66, the drain of n-channel FET 68, and the gate of p-channel FET 70. The other end of resistor 62 is coupled to the drain of FET 70 and through surge protection circuitry, i.e. back-to-back zener diodes 72, to ground.

The gate of FET 68 is coupled to an output of microprocessor controller 74 by line 76 while the source of FET 68 is coupled to ground. The gate of FET 64 is coupled to one end of resistor 78 with the other end of resistor 78 coupled to ground. The gate of FET 64 is also coupled to the anode of zener diode 80. The cathode of zener diode 80 is coupled to one end of capacitor 82 with the other end of capacitor 82 coupled to ground. The source of FET 70 is coupled to one end of inductor 84. The other end of inductor 84 is coupled to the anode of diode 86. The cathode of diode 86 is coupled to one end of resistor 88, the one end of capacitor 82, and the cathode of zener diode 80. The other end of resistor 88 is coupled to the drain of n-channel FET 90, while the source of FET 90 is coupled to ground. The gate of FET 90 is coupled by line 92 to an output of controller 74 and to ground through resistor 94.

Controller 74 utilizes outputs for controlling the transmitter circuitry. One such output is coupled by line 76 to the gate of FET 68 as previously described. Another output is coupled by line 96 to a control input of power regulator 98. Another output is coupled by line 92 to the gate of FET 90 also as previously described. A pair of outputs are coupled by lines 100 and 102 to multiplexing logic 104. The final controller output is coupled by line 106 to interface logic 108.

Power regulator 110 receives input power on line 112 which is coupled to the nodal connection of the cathode of diode 86, the one end of resistor 88, the one end of capacitor 82 and the cathode of zener diode 80. Power regulator 110 provides regulated +5 volt d.c. power on line 114 to controller 74. Power regulator 110 is preferably a device having a low quiescent current and low drop-out voltage. Although a power regulator is preferred, it is envisioned that a series zener diode resistor combination may be utilized. A clock signal is provided to controller 74 from clock oscillator logic 116 which is comprised of capacitors 118 and 120, and crystal 122. Controller 74 also receives input digital data on input line 124, which is coupled from interface logic 108 from an external monitoring device as will be described later. Controller 74 is preferably a microprocessor controller which includes an internal memory for data and instruction storage. Controller 74 is also preferably of a type capable of a "sleep mode" in which minimal power is consumed and processing activity is suspended for a predetermined period of time. Multiplexer 104 also receives on line 102 from controller 24 an input select signal.

Interface logic 108 is comprised of an output portion and an input portion. The output portion couples a data request signal that is sent to a trailer data monitoring system for controller 74. The input portion couples data provided from the trailer data monitoring system to the transmitter. Interface logic 108 provides RS-232 level compatibility with external devices coupled to transmitter 22 at interface logic 108.

The output portion of interface logic 108 is comprised of inverter line driver 126 which has an input coupled by line 106 to an output of controller 74. The output of inverter 126 is coupled through series resistors 128 and 130 to a terminal (not shown) in connector 132. Surge protection circuitry, comprised of parallel coupled capacitor 134 and back-to-back zener diodes 136, is coupled between resistors 128 and 130, and ground.

The input portion of interface logic 108 is comprised of inverter line driver 138 which has an output coupled by line 124 to an input of controller 74 and an input of multiplexer 104. The input of inverter 138 is coupled through series resistor 140 to another terminal (not shown) in connector 132. Surge protection circuitry, comprised of parallel coupled capacitor 142 and back-to-back diodes 144, is coupled between the input of inverter 138 and ground.

Multiplexer 104 is typically comprised of a series of logic gates and selectively provides an output of data received on either line 124 from an external device or identification data received on line 100 from controller 74. The output of multiplexer 104 is coupled on line 154 to modulation circuit 156. Multiplexer 104 also receives on line 102 from controller 74 an input select signal.

Power is provided to modulation circuit 156, interface logic 108, and multiplexer 104 by power regulator 98. Power regulator 98 receives unregulated power on line 158 which couples power regulator 98 to a node between inductor 84 and the anode of diode 86. Power regulator 98 provides output regulated power, typically at +5 volt d.c., on line 160 to inverters 126 and 138 of interface logic 108, and to the logic gates of multiplexer logic 104. Power is also provided from power regulator 98 on line 160 to modulation circuit 156.

Modulation circuit 156 is comprised of oscillator 162, dual-modulus prescaler 164 and low pass filter 166. Power is provided to oscillator 162 and prescaler 164 from power regulator 98 on line 160. Oscillator 162 is typically a crystal clock oscillator which provides an output signal typically of a frequency of 14.31818 MHz. Prescaler 124 is clocked by the output signal from oscillator 162 via input line 168. The selection of the divide modulus of dual-modulus prescaler 164 (divide by 31 or 32) is affected by the bit status of the data output from multiplexer 104 on line 154 and coupled to the modulus control input of prescaler 164. Thus the data output from prescaler 164 is frequency-shift key data. Although FSK modulation is preferred it is envisioned that various other modulation schemes may be utilized. The FSK modulated data output from prescaler 164 is coupled on line 170 to the input of low pass filter 166 which typically has a pole frequency of 500 KHz. The output of low pass filter 166 is coupled on line 172 to a nodal connection between one end of inductor 84 and the source of FET 70.

Figure 4:
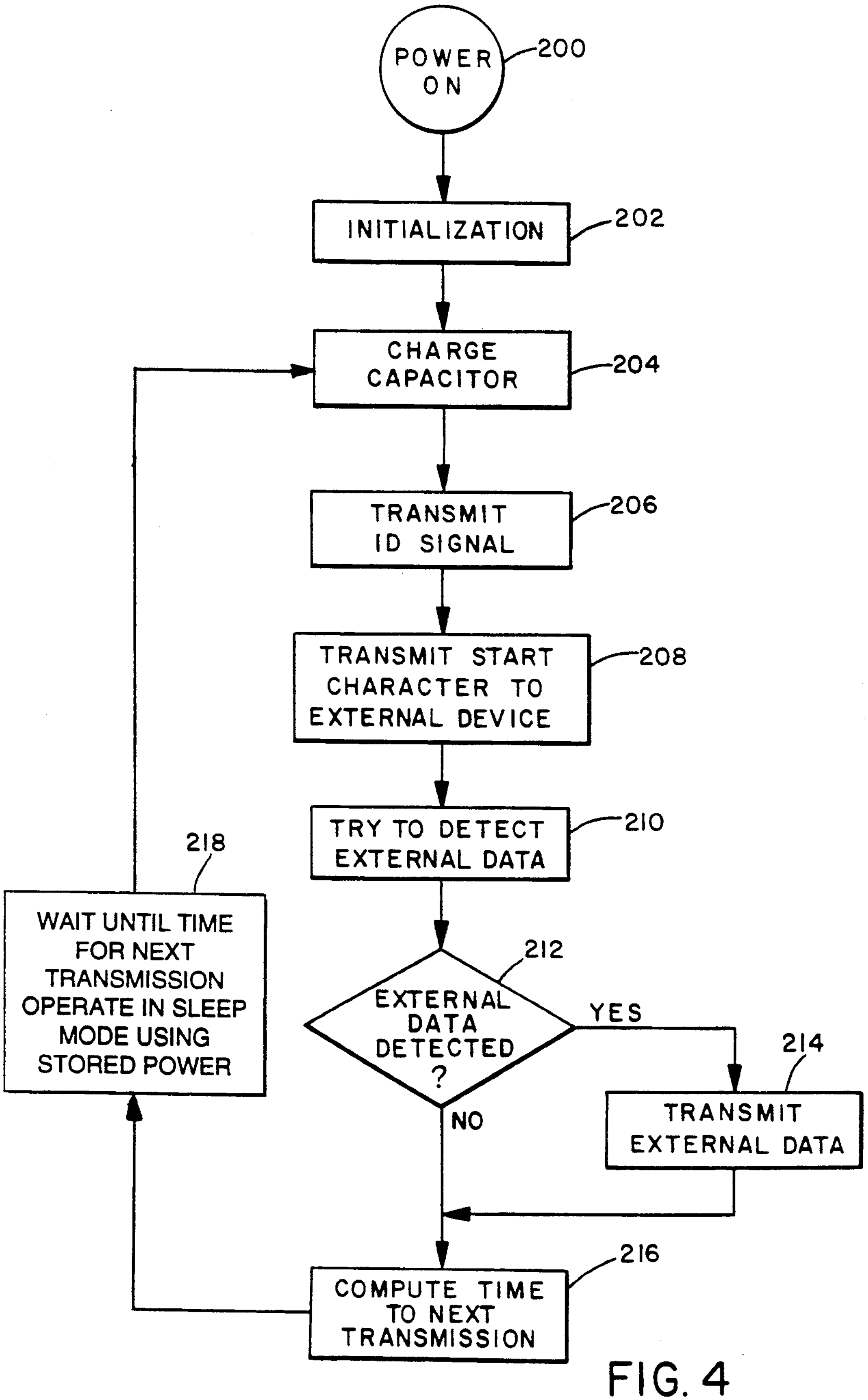
FIG. 4 is a flowchart illustrating the operation of the transmitter of FIG. 3.

FIG. 4 is a flow chart illustrating the general operation of the transmitter of the present invention. Operation of the transmitter begins when the transmitter is connected to the existing tractor-trailer wiring so as to provide power to the transmitter, illustrated by circle 200 Once power is provided to the transmitter, power is provided to the microprocessor controller which then begins an initialization sequence as indicated by block 202. The transmitter then proceeds to charge a "sleep mode" energy storage capacitor (capacitor 82 of FIG. 3), block 204. This storage capacitor provides power to the transmitter during a "sleep mode" operation as later described in further detail.

Once the storage capacitor is charged to a sufficient level, the transmitter generates and transmits an identification signal representative of an identification code corresponding to the trailer in which located, block 206. This identification signal is transmitted to the tractor located receiver in the form of an FSK modulated signal, via the +12 volt d.c. auxiliary power line of the existing tractor-trailer wiring. The modulated identification signal is an FSK modulated representation of digital data comprising several bytes of information corresponding to a trailer identification code.

Once the identification signal has been transmitted, the transmitter attempts to interrogate any external data monitoring devices to which it may be connected via the transmitter interface logic. The transmitter interrogates an external data monitoring devices by transmitting a start character to the external device, block 208, via the interface logic. The transmitter will then try to detect any data, block 210, output by an external data monitoring device to the transmitter interface logic in response to the transmitter interrogation.

If the transmitter detects the receipt of data from the external device, block 212, then the transmitter transmits the data to the receiver, block 214, via the +12 volt d.c. auxiliary power line of the existing tractor-trailer wiring in the form of an FSK modulated signal. After the external device data has been transmitted to the receiver, or there has been no external device data detected by the transmitter, the transmitter computes the time until it will again transmit, block 216. The computed time interval until the next transmission is randomly selected so as to be different for each transmission cycle. The time is selected at random so as to minimize the occurrence of simultaneous transmissions of signals by two or more transmitter units when multiple trailers are present.

Once the time interval is computed the transmitter enters a "sleep mode", block 218, in which operational power to the transmitter is provided by the storage capacitor. After the computed time interval has elapsed the transmitter begins another cycle by transmitting the identification signal, block 206.

Figure 5:
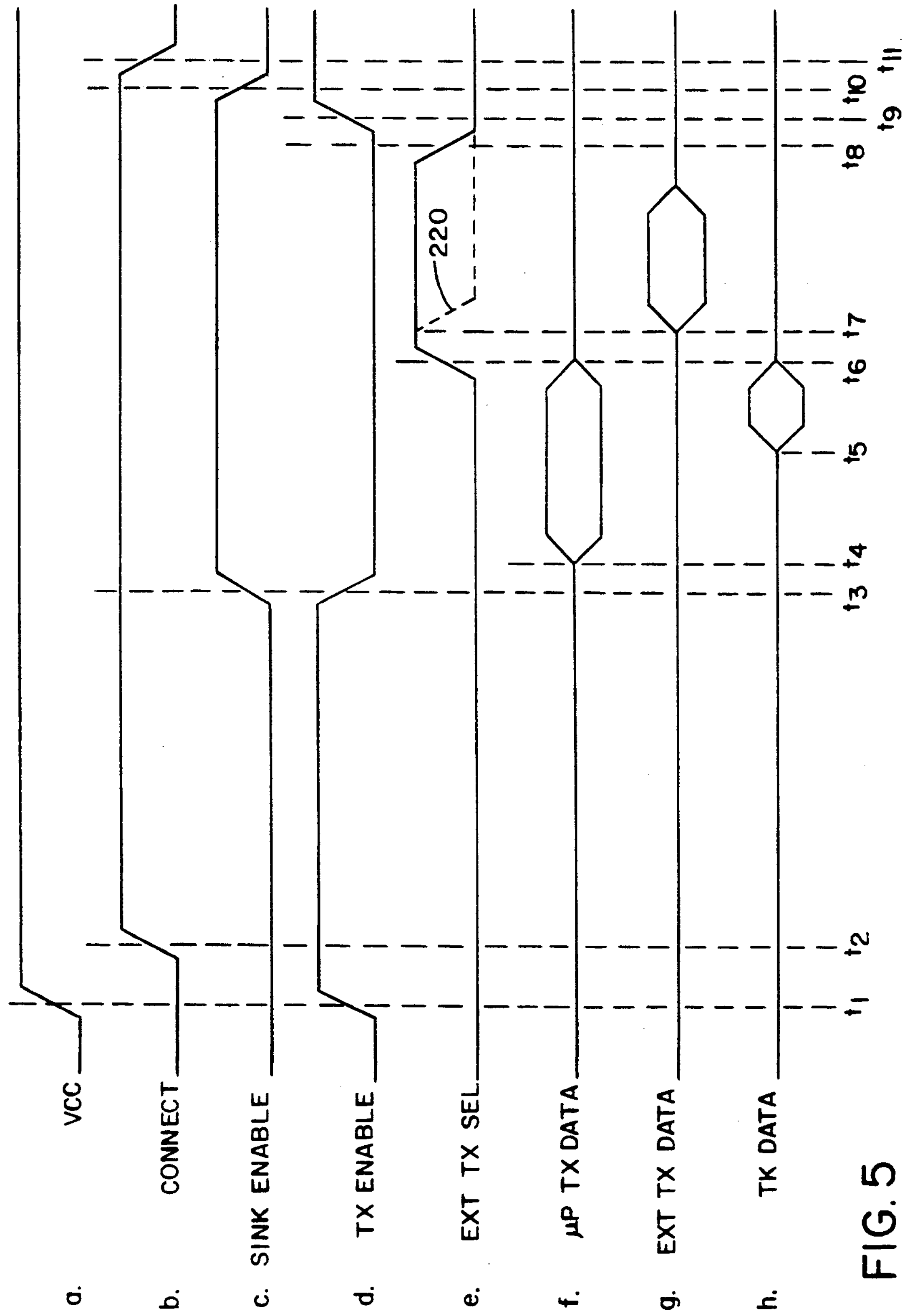
FIG. 5 is a diagram of the timing and coordination of the signals generated in the transmitter electronics.

FIG. 5 is an illustration of the timing and coordination of the power, control, and data signals of the transmitter of this invention. In the following description of FIG. 5 reference is also made to FIG. 3. In FIG. 5, at time $t_1$ transmitter 22 is initially coupled to the existing tractor-trailer wiring. At time $t_1$, power is provided to transmitter 22 as indicated by the voltage signal $V_{cc}$ which is typically +12 volt d.c. The voltage signal $V_{cc}$ is illustrated in FIG. 5 by line 5*a*. When power is applied to the transmitter circuit, the voltage $V_{cc}$ appears at the drain of FET 64, the gate of FET 66 and the gate of FET 70. FET 64 is therefore initially nonconducting or off, since there is no charge on capacitor 82 to which the gate of FET 64 is connected. Since FET 70 is a P channel device, the high voltage at the drain thereof turns off FET 70. However, with FET 66 initially off, when the high $V_{cc}$ voltage level appears at the gate of FET 66, FET 66 begins conducting or turns on. When FET 66 turns on, the voltage at the drain of FET 66 goes to nominally zero volts. Since the drain of FET 66 is coupled to the gate of P channel FET 70, when the drain of FET 66 goes to nominally zero volts FET 70 turns on.

When FET 70 turns on, current is allowed to pass to capacitor 82, thus charging capacitor 82. When capacitor 82 charges to a level such that the voltage at the junction coupling capacitor 82 and zener-diode 80 is greater than the break down voltage of zener-diode 80, current passes through zener-diode 80 to the ground through resistor 78. With gate of FET 64 coupled to resistor 78, the voltage appearing across resistor 78 turns on FET 64. Once FET 64 turns on, the voltage at its drain becomes nominally zero and with the drain of FET 64 coupled to the gate of FET 66, FET 66 turns off. When FET 66 turns off, the voltage at the drain of FET 66 raises to a level sufficient to turn off FET 70 whose gate is coupled to the drain of FET 66.

Capacitor 82 is coupled to power regulator 110 to provide power thereto. When capacitor has charged to a level sufficient for operation of power regulator 110, power regulator 110 provides a regulated voltage typically +5 volt d.c., to controller 74. When power is provided to controller 74, controller 74 begins executing program instructions stored within a memory therein.

At time $t_2$, controller 74 sets previously low line 76 to high as indicated by the CONNECT signal illustrated in FIG. 5 as line 5*b*. FET 68 is responsive to the CONNECT signal and turns on when the CONNECT signal is high. When FET 68 turns on, the drain of FET 68 goes to nominally zero volts. With the gate of FET 70 coupled to the drain of FET 68, the nominally zero voltage level appears at the gate of FET 70 which then turns on. When FET 70 turns on, current passes through FET 70 to further charge capacitor 82. The CONNECT signal is held high for a predetermined period of time, thus allowing capacitor 82 to charge.

At time $t_3$, controller 74 brings line 92 high, which is represented by the SINK ENABLE signal illustrated in FIG. 5 by line 5*c*. It should be noted that the time period $t_2$–$t_3$ is five seconds upon initial interconnection of the transmitter to the power line. However, during continuous operation of the transmitter the time period $t_2$–$t_3$ is typically 2 us. At time $t_3$, FET 90 responds to the high SINK ENABLE signal by turning on. With FETs 70 and 90 on, current passes through these FETs to ground. Resistors 62 and 88 are of such a value that approximately 500 mA of current is drawn from line 50. Once power is being drawn through this path, power becomes available to power regulator 98 via line 158 and power regulator 110 via line 112.

Furthermore at time $t_3$, controller 74 brings low line 96 which is represented by the TX ENABLE signal illustrated in FIG. 5 by line 5*d*. Power regulator 98 is responsive to a low TX ENABLE at the control input of power regulator 98 for enabling power output therefrom. Power regulator 98, when enabled and unregulated power is provided thereto, typically provides an output of regulated 5 volts d.c. power. Power regulator 98 provides regulated power to the transmitter modulation circuitry 156.

Therefore at time $t_3$, approximately 500 mA of current is being drawn through resistor 62 and FET 70. With line 158 coupled between inductor 84 and diode 86, power is coupled to power regulator 98. Modulation circuitry 98 is thus fully powered with regulated power provided on line 160 from power regulator 98 to oscillator 162 and prescaler 164.

It is important that a current of at least 500 mA be drawn over the +12 volt d.c. auxiliary power line by the transmitter to ensure the integrity of the transmitted signal during transmission. The connectors which couple the tractor wiring to the trailer wiring typically provide adequate but not the highest quality connection possible for purposes of high frequency signal transmission. These particular connectors have large surface area connecting elements, which due to the nature of their environment, are susceptible to oxidation, corrosion, dirt, oil, etc. By drawing at least 500 mA through these connectors shortly before and during signal transmission, the quality of interconnection in the connectors is improved sufficient to insure high signal fidelity.

At time $t_4$, typically occurring approximately 20 ms after time $t_3$, controller 74 places trailer identification data, represented by the signal uP TX DATA illustrated by line 5*f* in FIG. 5, on line 100. With the EXT TX SELECT signal provided on line 102 by controller 74 low, the trailer identification data passes through multiplexer 104. The output of multiplexer 104 is coupled to the modulus control input of prescaler 164. The varying states of the trailer identification data modulates an identification signal, i.e. the state of each bi-state bit of the data determines the modulation frequency of the corresponding portion in the transmitted identification signal. The modulated identification signal is coupled through low pass filter 166, FET 70 and resistor 62 onto line 50. Inductor 84 is utilized to prohibit the high frequency identification signal from being conducted into the remaining transmitter circuitry.

At time $t_5$, controller 74 places external device interrogation data signal on line 106. The interrogation data signal is represented by the signal TK DATA illustrated in FIG. 5 by the line 5*h*. The TK DATA signal passes through interface logic 108 to any data monitoring systems which may be coupled thereto. The TK DATA signal serves to interrogate any of these data monitoring systems. Any of the data monitor systems may be responsive to signal TK DATA by returning device data to interface logic 108.

At time $t_6$, the controller 74 has completed outputting the identification data to the modulation circuit 156 and sets the EXT TX SEL signal on line 102 high. Multiplexer 104 is responsive to the high EXT TX SEL signal such that if data is provided from the external device it is coupled by interface logic 108 to multiplexer 104. Multiplexer outputs the external device data on line 154 to modulus control input of prescaler 164.

If by time $t_7$, typically occurring 0–5 ms after time $t_6$, external device data on line 124 is detected by processor 74, the signal EXT TX SEL remains high until time $t_8$. Time $t_8$, typically occurs 250 ms after time $t_7$. External device data is represented by the signal EXT TX DATA in FIG. 5 by line 5*g*. While the signal EXT TX SEL is high, signal EXT TX DATA is coupled to the output of multiplexer 104 to the modulus control input of prescaler 164. Thus a modulated form of the external device data is coupled to the +12 volt d.c. auxiliary power line of the existing tractor-trailer wiring in the same fashion as the trailer identification signal.

If at time $t_7$ controller 74 has not detected the presence of external data, the signal EXT TX SEL is set low. This condition of the EXT TX SEL signal is indicated by the dashed line 220. If the EXT TX SEL signal is set low at time $t_7$, the 250 ms time period between time $t_7$ and time $t_8$ is eliminated. In this condition, time $t_7$ and time $t_8$ occur simultaneously.

With the EXT TX SEL signal set low at time $t_8$, controller 74 at time $t_9$ sets the TX ENABLE signal high. Power regulator 98 is disabled in response to a high TX ENABLE signal. Once disabled, power regulator 98 discontinues providing output power on line 160. Thus, modulation circuitry 156 is turned off.

At time $t_{10}$, controller 74 sets the SINK ENABLE signal low. FET 90 turns off in response to a low SINK ENABLE signal. At time $t_{11}$, controller 74 sets the CONNECT signal low. The time period $t_{10}$–$t_{11}$ is typically 25 ms with the circuit of FIG. 2 functioning similar to that during the time period $t_2$–$t_3$. FET 68 responds to a low CONNECT signal by turning off. When FET 68 turns off, the drain of FET 68, which is coupled to the gate of FET 70 goes to a voltage level sufficient to turn off FET 70. When both FET 68 and FET 70 are off, current is no longer drawn from the 12 volt d.c. auxiliary power line. Controller 74 computes a "sleep time" and cycles to a "sleep mode". After the computed "sleep time" has expired, controller begins the transmission cycle again at the point marked time $t_2$.

During the period controller 74 is in the "sleep mode", power is provided to controller 74 by capacitor 82 via power regulator 110. Capacitor 82, as discussed earlier, stores energy during the time period $t_2$–$t_{11}$ so as to be capable of providing operational power to controller 74 during the "sleep mode" period.

Figure 6:
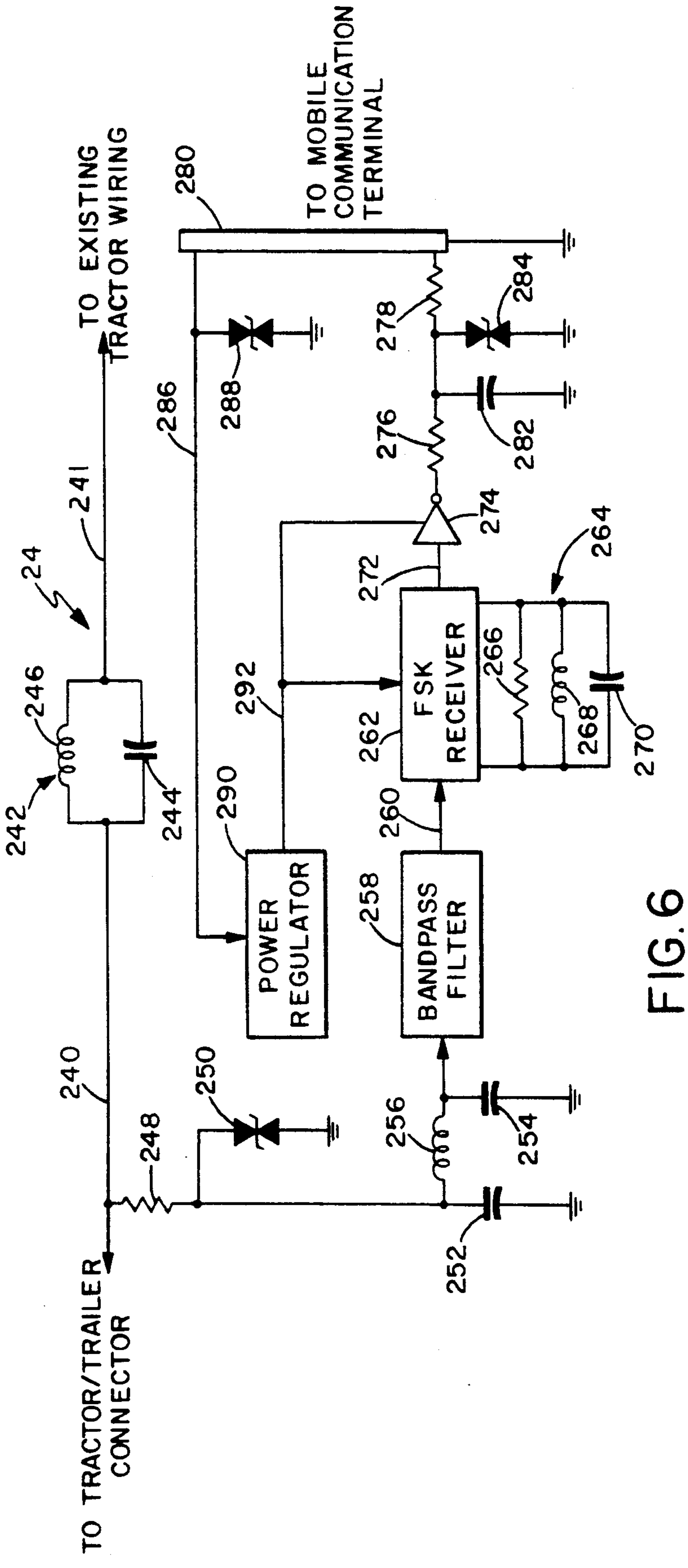
FIG. 6 is a schematic diagram of the receiver of the present invention.

The receiver utilized in the present invention serves to demodulate the trailer identification and status information provided by the transmitters on the existing tractor-trailer wiring. The receiver then provides the information to an input of the mobile communications terminal. A schematic diagram of an exemplary receiver 24, of the present invention is shown in FIG. 6. In FIG. 6, portions of the +12 volt d.c. auxiliary power line existing in the tractor wiring utilized to provide power to the trailers are indicated by the reference numerals 240 and 241. Conductor or line portion 240 connects the tractor/trailer connector to receiver 24 and tuned circuit 242. Conductor or line portion 241 connects the tractor electrical system, and any other tractor electronics, to tuned circuit 242. Existing tractor electrical system and electronics other than receiver 24 are isolated from the high frequency signals generated by the transmitter by tuned circuit 242, and vice versa. Tuned circuit 242 is comprised of parallel coupled capacitor 244 and inductor 246.

Receiver 24 is coupled to line portion 240 by one end of resistor 248. The other end of resistor 248 is coupled to surge protection circuitry comprised of back-to-back zener diodes 250 coupled to ground. The other end of resistor 248 is also coupled to an impedance matching circuit comprised of capacitors 252 and 254 and inductor 256. One end of capacitor 252 and inductor 256 are coupled to the other end of resistor 248. The other end of inductor 256 is coupled to one end of capacitor 254 and an input of band pass filter 200. The other ends of capacitors 252 and 254 are coupled to ground.

The output of band pass filter 258 is coupled on line 260 to an input of a frequency shift keyed (FSK) receiver 262. FSK receiver 262 has coupled thereto an external tuned tank circuit 264 which is comprised of parallel coupled resistor 266, inductor 268 and capacitor 270. The output of FSK receiver 262 is coupled on line 272 to an input of inverter line driver 274. The output of inverter 274 is coupled through series resistors 276 and 278 to a terminal (not shown) in connector 280 at an RS-232 compatible signal level. Surge protection circuitry comprised of parallel coupled capacitor 282 and back-to-back zener diodes 284, is coupled between resistors 276 and 278, and ground. Connector 280 couples receiver 24 to the truck mobile communications terminal (not shown).

Power is provided to receiver 24 via the mobile communications terminal. Connector 280 includes a terminal (not shown) which couples to the mobile communications terminal for providing +12 volt d.c. power to receiver 24 on line 286. Line 286 also includes surge protection circuitry in the form of back-to-back diodes 288 which couple line 286 to ground. Line 286 is coupled to power regulator 290 which provides regulated +5 volt d.c. output power on line 292 to FSK receiver 262 and inverter 274. The frequency shift keyed signal as received from transmitter 22 is coupled on line 240 to receiver 24. This signal travels through resistor 248, the impedance matching circuitry, as an input to band pass filter 258. The band limited signal is coupled out of band pass filter 258 into FSK receiver 262. FSK receiver 262 is tuned to a nominal center frequency of 455 kHz by external tuned tank circuit 264. FSK receiver 262 demodulates the FSK signal received so as to produce serial data which is output on line 272 to the input of inverter 274. The output of inverter 274 is coupled through series resistors 276 and 278 to a serial interface of the mobile communications terminal.

It is further envisioned that a transmitter and receiver may be combined into a single transceiver unit. Transceivers may be placed in both the tractor and trailer for enabling bi-directional communications. The tractor transceiver processor may be capable of providing commands to the trailer for execution by equipment therein or process information received from the trailer. The trailer transceiver may also generate commands for execution by trailer equipment or transfer data between the equipment and the tractor.

The previous descriptions of the preferred embodiments are provided to enable any person skilled in the art to make or use the present invention. Various modifications to these embodiments will be readily apparent to those skilled in the art, and the generic principals defined herein may be applied to other embodiments without the use of the inventive facility. Thus, the present invention is not intended to be limited to the embodiments shown herein, but is to be accorded the widest scope consistent with the principals and novel features disclosed herein.

We claim:

1. In a truck having a tractor with a mobile communications terminal and a trailer, said tractor capable of electrical connection to said trailer by a power and control bus which includes a power line for providing power from said tractor to said trailer, said truck having a trailer identification system for providing trailer identification information from said trailer, when connected to said power and control bus, to said tractor for transmission by said mobile communications terminal to a central facility, said trailer identification system comprising:

transmitter means located in said trailer for, when said trailer is coupled to said said tractor by said power and control bus, providing at predetermined times upon said power line of said truck power and control bus a unique identification signal representative of trailer identification information corresponding to said trailer and, wherein said transmitter means comprises:

processor means for, at predetermined instances in time and for a predetermined time period from each instance in time, generating a connect signal, and for during a portion of each time period, generating an identification code;

modulator means connected to said processor means for, during each time period, receiving said identification code, generating a carrier signal, modulating said carrier signal with said identification code, and providing an output of said identification code modulated carrier signal;

energy storage means connected to said processor means for, storing electrical power during each time period and providing stored electrical power to said processor means at times other than during each time period; and coupling means connected to said power line, said energy storage means, said processor means and said modulator means for, during each time period, receiving said connect signal and in response thereto coupling electrical power from said power line to said energy storage means, said processor means and said modulator means, and coupling said identification code modulated carrier signal as said identification signal upon said power line, said coupling means further for, at times other than during each time period, electrically decoupling said energy storage means, said processor means and said modulator means from said power line; and receiver means located in said tractor for, receiving and demodulating said identification signal as provided upon said power line, and providing each demodulated identification signal as said identification code to said mobile communications terminal.

2. The system of claim 1 wherein at least said trailer has a physical parameter monitoring system capable of measuring predetermined physical parameters, said physical parameter monitoring system responsive to an interrogation signal of providing data indicative of said measured physical parameters, and wherein said processor means is further for, during each time period, generating and providing said interrogation signal to said physical parameter monitoring system, said modulator means further for, during each time period, receiving said data from said physical parameter monitoring system, modulating said received data and providing said modulated data to said coupling means, said coupling means further for, during each time period, providing said modulated data as a data signal on said power line.

3. The system of claim 2 wherein said receiver means is further for receiving and demodulating said data signal as provided upon said power line, and providing said demodulated data signal as said data to said mobile communications terminal.

4. The system of claim 1 wherein said processor means is further for, during a current time period, computing a time interval between an end of said current time period and a beginning of a next time period.

5. The system of claim 1 wherein said trailer has an electrical system coupled to said power and control bus and wherein said system further comprises isolation means disposed in said power line between said transmitter means and said electrical system for isolating said identification signal, as coupled on said power line, from said electrical system.

6. The system of claim 1 wherein said modulator means comprises:

an oscillator having an output;

a frequency-shift key modulator having a carrier frequency input coupled to said oscillator output, a modulation input coupled to said processor means for receiving said identification signal, and an output; and a low pass filter having an input coupled to said modulator output, and an output coupled to said coupling means.

7. The system of claim 1 further comprising power regulation means for, during each time period, receiving via said coupling means unregulated power from said power line, regulating said power line unregulated power, and providing said regulated power line power to said processor means, said modulator means and said energy storage means, said power regulation means further for, at times other than during each time period, receiving unregulated power from said energy storage means, regulating said energy storage means unregulated power, and providing said regulated energy storage means power to said processor means.

8. The system of claim 7 wherein said power regulation means comprises:

a first voltage regulator having a power input coupled to said coupling means and said energy storage means, and an output coupled to said modulator means;

a second voltage regulator having a power input coupled to said coupling means, a control input coupled to said processor means, and an output coupled to said modulator means; and wherein said processor means if further for generating a disable signal at times other than during each time period, said second voltage regulator for receiving at said control input said disable signal and responsive thereto for disabling the providing of power to said modulator means.

9. The system of claim 1 wherein said coupling means, upon initial coupling of electrical power from said power line to said energy storage means, is responsive to a predetermined level of energy stored by said energy storage means for decoupling electrical power from said power line to said energy storage means, said processor means and said modulator means, said energy storage means for providing electrical power to said processor means prior to a first predetermined time period.

10. The system of claim 1 wherein said modulator means frequency-shift key modulates said carrier signal and wherein said receiver means further comprises:

demodulator means for, receiving and frequency-shift key demodulating said indentification signal, and providing said identification code; and interface means for receiving from said demodulator means said identification code, buffering said identification code and providing an output of said identification code to said mobile communications terminal.

11. The system of claim 3 wherein said modulator means frequency-shift key modulates said carrier signal and wherein said receiver means further comprises:

demodulator means for, receiving and frequency-shift key demodulating said indentification signal and said data signal, and respectively providing said identification code said data; and interface means for receiving from said demodulator means said identification code and said data, buffering said identification code and said data, and providing an output of said identification code and said data to said mobile communications terminal.

12. A tractor-trailer data link for communicating information between a tractor and at least one trailer upon a common power line coupling said tractor to each trailer with said tractor providing electrical power to each trailer upon said power line, said data link comprising:

transmitter means for locating in a corresponding trailer for, at predetermined times for a predetermined time period, electrically self-coupling to said power line, receiving electrical power from said power line, storing a portion of said received electrical power, generating a digital identification code indicative of trailer identification information, generating a carrier signal of a predetermined frequency, modulating said carrier signal with said identification code, and providing said identification code modulated carrier signal upon said power line connecting said tractor to said trailer, and for, during time intervals other than during each time period, electrically self-decoupling from said power line and using said stored portion of electrical power as transmitter means operational power; and receiver means for locating in said tractor for, receiving said identification code modulated carrier signal transmitted upon said power line, detecting the modulation on said identification code modulator carrier signal with the detected modulation corresponding to said identification code, and providing an identification output signal corresponding to said detected modulation and indicative of said trailer identification information.

13. The tractor-trailer data link of claim 12 wherein an apparatus in a trailer is capable of providing trailer and/or load status information in the form of digital data, said transmitter means further for receiving digital data, modulating said carrier signal with said data, and providing said data modulated carrier signal upon said power line; and said receiver means further for receiving said data modulated carrier signal transmitted upon said power line, detecting the modulation on said data modulated carrier signal with the detected modulation corresponding to said data, and providing a data output signal corresponding to the detected modulation and indicative of said trailer and/or load status information.

14. The tractor-trailer data link of claim 12 wherein said transmitter means frequency-shift key modulates said carrier signal with said identification code.

15. The tractor-trailer data link of claim 12 wherein said transmitter means frequency-shift key modulates said carrier signal respectively with said identification code and said data.

16. A method for providing trailer identification information to a tractor from a trailer when said tractor is coupled to said trailer comprising the steps of:

electrically coupling, at predetermined instances in time and for a predetermined time period from the occurrence of each instance in time, a transmitter to a power line connecting a tractor to a trailer;

receiving, in said transmitter during said time period, electrical energy from said power line;

storing in said transmitter a portion of said received electrical energy;

generating, in said transmitter during a portion of each time period, a digital identification code indicative of trailer identification indicia corresponding to said trailer;

generating, in said transmitter during each time period, a carrier signal of a predetermined frequency;

modulating, in said transmitter during each time period, said carrier signal with said identification code to produce an identification signal;

transmitting, from said transmitter upon said power line during each time period, said identification signal;

electrically decoupling said transmitter from said power line at times other than during each time period;

powering said transmitter with said stored electrical energy at said times other than during each time period;

receiving, upon said power line at a receiver in said tractor, said transmitted identification signal;

detecting the modulation on said received identification signal; and providing an output signal corresponding to the detected modulation on said received identification signal wherein the detected modulation corresponds to said identification code.

17. The method of claim 16 for further communicating trailer and/or load status information to a tractor from a trailer comprising the steps of:

receiving, at said transmitter in said trailer, digital data indicative of trailer and/or load status information;

modulating, in said transmitter during a different portion of each time period, said carrier signal with said data so as to produce a data signal;

transmitting, from said transmitter upon said power line during said different portion of each time period, said data signal;

receiving, upon said power line at a receiver in said tractor, said transmitted data signal;

detecting the modulation on said received data signal; and providing an additional output signal corresponding to the detected modulation on said received data signal wherein the detected modulation corresponds to said data.

* * * * *